US009582976B2

(12) United States Patent
Chin et al.

(10) Patent No.: US 9,582,976 B2
(45) Date of Patent: Feb. 28, 2017

(54) SYSTEMS AND METHODS FOR DETECTING AND REPORTING HAZARDS ON A PATHWAY

(71) Applicant: Elwha, LLC, Bellevue, WA (US)

(72) Inventors: Hon Wah Chin, Palo Alto, CA (US); Roderick A. Hyde, Redmond, WA (US); Jordin T. Kare, Seattle, WA (US); Elizabeth A. Sweeney, Seattle, WA (US)

(73) Assignee: ELWHA LLC, Bellevue, WA (US)

( * ) Notice: Subject to any disclaimer, the term of this patent is extended or adjusted under 35 U.S.C. 154(b) by 378 days.

(21) Appl. No.: 14/516,424

(22) Filed: Oct. 16, 2014

(65) Prior Publication Data

US 2016/0110981 A1    Apr. 21, 2016

(51) Int. Cl.
*G08B 23/00* (2006.01)
*G08B 21/02* (2006.01)
*A01M 29/00* (2011.01)

(52) U.S. Cl.
CPC .............. *G08B 21/02* (2013.01); *A01M 29/00* (2013.01)

(58) Field of Classification Search
CPC . G08B 21/22; G08B 21/0288; G08B 21/0446; A61B 5/0002; G06F 19/3418
See application file for complete search history.

(56) References Cited

U.S. PATENT DOCUMENTS

| | | | | |
|---|---|---|---|---|
| 4,504,933 A * | 3/1985 | Janney | ..................... | G08B 3/10 340/815.69 |
| 5,703,368 A * | 12/1997 | Tomooka | ............... | G08B 13/19 250/349 |
| 5,732,401 A * | 3/1998 | Conway | ................ | G06F 19/328 700/90 |
| 6,685,332 B1 * | 2/2004 | Clark | .................... | E04F 11/163 362/145 |
| 7,702,019 B2 | 4/2010 | Iwasaki et al. | | |
| 7,852,217 B2 | 12/2010 | Kondo et al. | | |
| 7,862,475 B2 | 1/2011 | Watterson et al. | | |
| 8,083,367 B2 * | 12/2011 | Anderson | ............... | F21S 8/032 315/312 |
| 8,306,265 B2 | 11/2012 | Fry et al. | | |
| 8,330,814 B2 | 12/2012 | Matsuda et al. | | |
| 8,365,869 B2 | 2/2013 | Stannah et al. | | |
| 8,497,634 B2 * | 7/2013 | Scharf | ................ | H05B 37/0227 315/149 |
| 8,525,874 B2 | 9/2013 | Willmann et al. | | |
| 8,542,118 B2 * | 9/2013 | Al-Kadi | .................. | G01V 8/20 340/541 |

(Continued)

*Primary Examiner* — Quang D Pham

(57) ABSTRACT

A safety system and associated methods of operation, for detecting an object on a pathway and reporting to a user information relating to the object to help the user avoid a collision with the object. The safety system includes a first sensor system for detecting the presence of the user and a second sensor system for detecting the object within the pathway. Upon detection of the object, the second sensor system obtains information relating to the object and generates a signal based on the obtained information. The signal is received by a reporting system, which generates a warning signal to communicate the object information to the user. The object information may include a location of the object on the pathway and an identification of the object for the user.

45 Claims, 4 Drawing Sheets

(56) References Cited

U.S. PATENT DOCUMENTS

| | | | |
|---|---|---|---|
| 8,773,299 B1* | 7/2014 | Woodell | G08G 5/0086 340/945 |
| 8,953,841 B1* | 2/2015 | Leblang | G06K 9/00671 345/633 |
| 9,311,802 B1* | 4/2016 | Chin | G08B 21/02 |
| 2004/0239915 A1* | 12/2004 | Anderson | A63B 69/0002 356/28 |
| 2005/0182590 A1* | 8/2005 | Kotter | G06K 9/00771 702/127 |
| 2006/0152374 A1* | 7/2006 | Singer | G07C 9/00111 340/573.4 |
| 2007/0045522 A1* | 3/2007 | Chien | G08B 13/19626 250/221 |
| 2007/0285510 A1 | 12/2007 | Lipton et al. | |
| 2008/0204258 A1 | 8/2008 | Dayton et al. | |
| 2010/0029268 A1* | 2/2010 | Myer | F21S 2/00 455/426.1 |
| 2010/0177968 A1* | 7/2010 | Fry | A61B 5/0452 382/224 |
| 2010/0188217 A1* | 7/2010 | Gagnon | H05B 37/0227 340/541 |
| 2010/0194583 A1* | 8/2010 | Kawabata | F16P 3/14 340/3.6 |
| 2010/0216599 A1* | 8/2010 | Watterson | A63B 22/0242 482/4 |
| 2010/0289662 A1* | 11/2010 | Dasilva | F16P 3/147 340/686.6 |
| 2010/0314201 A1* | 12/2010 | Stannah | B66B 9/08 187/201 |
| 2012/0016496 A1* | 1/2012 | Kim | G08B 13/19 700/14 |
| 2012/0044074 A1* | 2/2012 | Mulla | G06Q 10/08 340/572.1 |
| 2012/0062357 A1* | 3/2012 | Slamka | G01C 21/20 340/4.11 |
| 2012/0146518 A1* | 6/2012 | Keating | H05B 37/0218 315/153 |
| 2012/0194554 A1* | 8/2012 | Kaino | G08B 13/19621 345/633 |
| 2013/0099922 A1* | 4/2013 | Lohbihler | G08B 13/184 340/539.17 |
| 2013/0166198 A1 | 6/2013 | Funk et al. | |
| 2013/0229518 A1 | 9/2013 | Reed et al. | |
| 2013/0232003 A1 | 9/2013 | Yeo | |
| 2013/0293586 A1* | 11/2013 | Kaino | G08G 1/005 345/633 |
| 2013/0332064 A1 | 12/2013 | Funk et al. | |
| 2014/0001961 A1* | 1/2014 | Anderson | H05B 37/0227 315/153 |
| 2015/0273697 A1* | 10/2015 | Abdullah | B25J 11/009 700/240 |

* cited by examiner

SYSTEMS AND METHODS FOR DETECTING AND REPORTING HAZARDS ON A PATHWAY

If an Application Data Sheet ("ADS") has been filed on the filing date of this application, it is incorporated by reference herein. Any applications claimed on the ADS for priority under 35 U.S.C. §§119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. §119(e) for provisional patent applications, for any and all parent, grandparent, great-grandparent, etc., applications of the Priority Application(s)).

PRIORITY APPLICATIONS

None.

RELATED APPLICATIONS

If the listings of applications provided herein are inconsistent with the listings provided via an ADS, it is the intent of the Applicants to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

The field of the present disclosure relates generally to safety systems for monitoring a pathway, and in particular, to such safety systems for detecting a hazard on the pathway and reporting to a user information relating to the hazard to help the user avoid a collision with the hazard.

SUMMARY

The present disclosure describes various embodiments for safety systems and methods of use for detecting a hazard on a pathway and reporting to a user information relating to the hazard (such as location of the hazard, movement pattern of the hazard, identification of the hazard, etc.) to help the user avoid a collision with the hazard. For example, in one embodiment, the safety system includes a first sensor system configured to detect the presence of a user (e.g., a person) within an activation field of the first sensor system, and a second system configured to detect the object or hazard on the pathway. The first sensor system may include one or more sensors that together define the activation field. The one or more sensors of the first sensor system may include optical sensors, infrared sensors, acoustics sensors, pressure sensors or any other suitable sensor configured to detect the presence of a user. When the first sensor system detects the user, the first sensor system may generate an activation signal, which may be used to activate the second sensor system.

As mentioned previously, the second sensor system is configured to detect an object within a sensor field of the second sensor system. In some embodiments, the sensor field overlaps or covers at least a portion of the pathway so that the second sensor system detects the object or hazard when present on the pathway. Similar to the first sensor system, the second sensor system may include one or more sensors, such as optical sensors, infrared sensors, acoustic sensors, or any other suitable sensors. In response to detecting the object within the sensor field, the second sensor system obtains or gathers information relating to the object, such as an image of the object, an identification of the object, a location of the object on the pathway and/or a location of the object relative to the location of the user. After obtaining the object information, the second sensor system generates an object signal based on the object information to communicate the object information to a reporting system.

The reporting system receives the object signal from the second sensor system and generates a warning signal to warn the user of the object located in the pathway and/or to communicate the object information to the user to notify the user about the object on the pathway, and to help the user identify a location/position of the object for avoiding a potential collision therewith. In some embodiments, the warning signal may be a visual signal that the user may perceive or an audible signal that the user may hear to alert the user to the presence of the object. In other embodiments, the object may be a pet, such as a cat or a dog, and the warning signal may instead be targeted at scaring the pet so that the pet moves away from the pathway. For example, in such embodiments, the warning signal may be an ultrasonic signal heard by the pet or a vibratory signal felt by the pet. In still other embodiments, the warning signal may be any other suitable signal that may be heard or perceived by the user, and/or a signal that may be heard, perceived, or felt by a pet.

In some embodiments, the safety system may be positioned to monitor a staircase having a plurality of steps. In such embodiments, the first sensor system may include an activation sensor near one or both of the top step and the bottom step so that the first sensor system is activated when the user approaches the staircase from either the top or the bottom of the staircase. The second sensor system may further include one or more object recognition sensors located at different points on the staircase to detect and identify the object at various points on the staircase.

In some embodiments, the safety system may further include an illumination system in communication with the second sensor system, the reporting system, or both. In response to detection of the object in the pathway, the illumination system may be activated to illuminate the pathway to make the object easier for the user to locate. In some embodiments, the illumination system may include one or more overhead light sources. In other embodiments, the illumination system may include one or more illumination sources, such as LEDs, adjacent each of the steps of the staircase, where the LEDs are individually illuminated based on the location of the object.

Additional details of these and other embodiments are described further below with reference to the accompanying drawings.

DETAILED DESCRIPTION OF EXAMPLE EMBODIMENTS

With reference to the drawings, this section describes particular embodiments of various safety systems and their detailed construction and operation. Throughout the specification, reference to "one embodiment," "an embodiment," or "some embodiments" means that a particular described feature, structure, or characteristic may be included in at least one embodiment of the safety system. Thus appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

Figure 1:
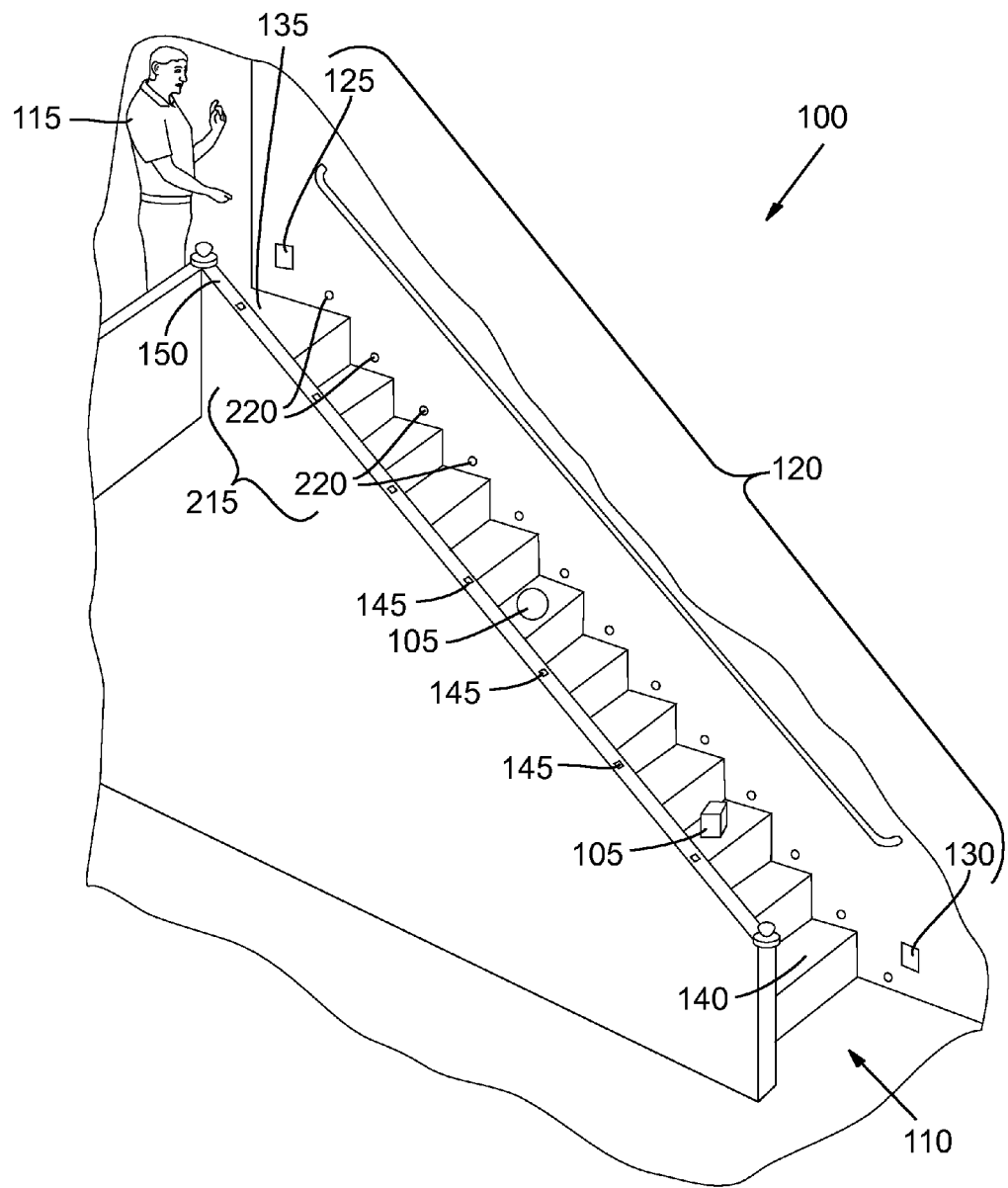
FIG. 1 illustrates a first sensor system monitoring a pathway with inanimate objects positioned at various locations of the pathway, according to one embodiment.
Figure 2:
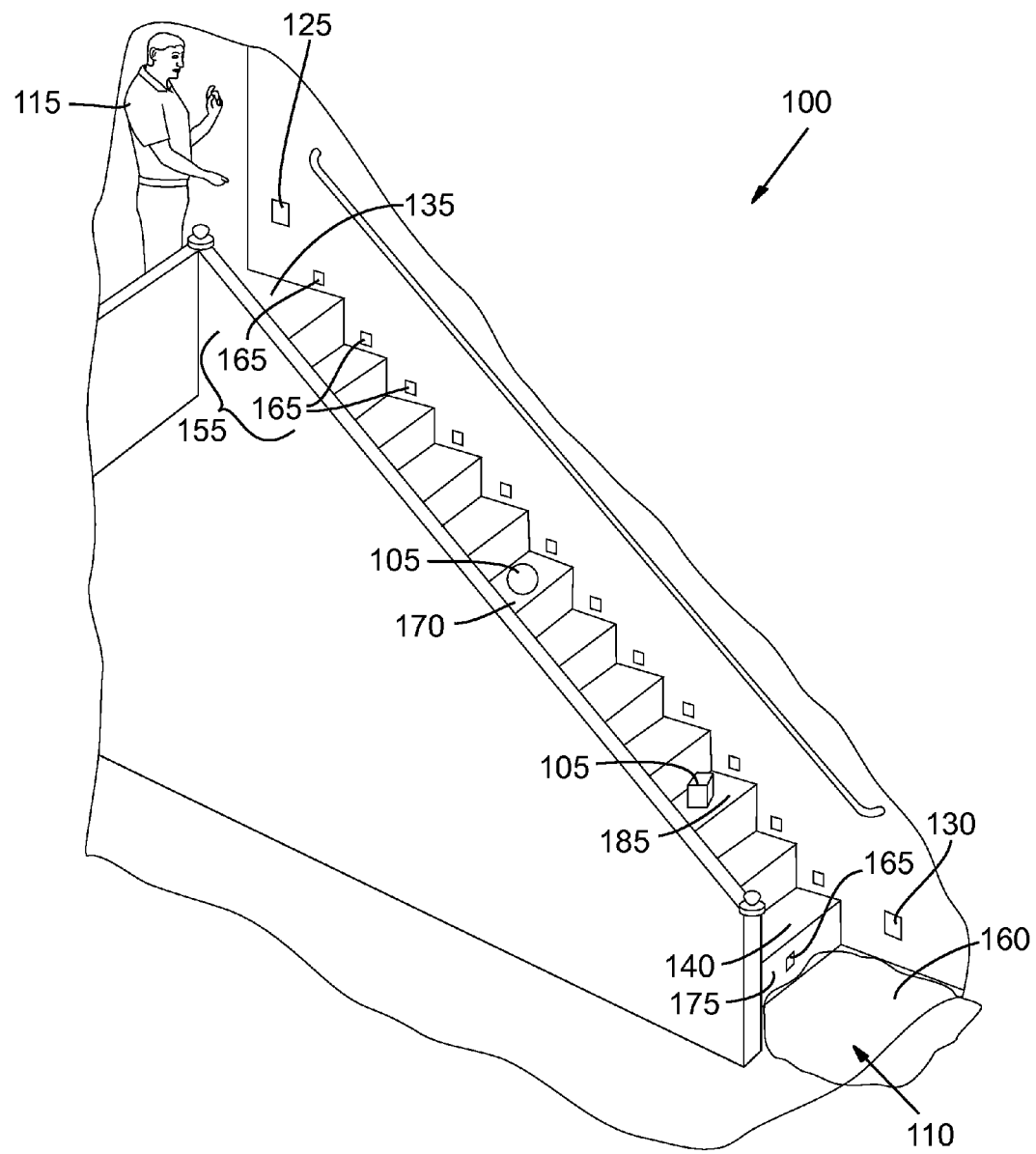
FIG. 2 shows the pathway of FIG. 1 and illustrates a second sensor system for monitoring a pathway with inanimate objects positioned at various locations of the pathway.
Figure 3:
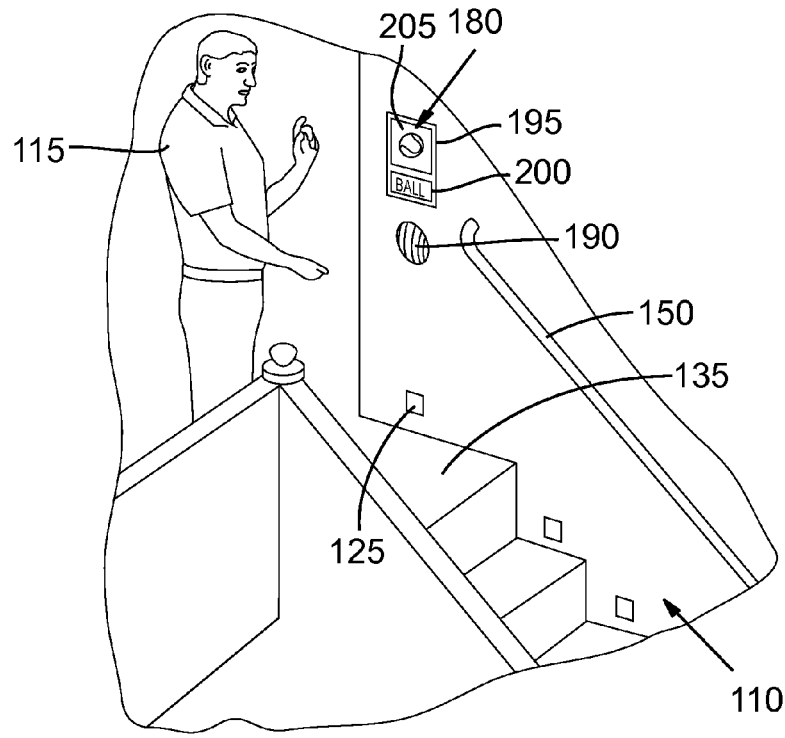
FIG. 3 is a partial cut-away view of the pathway illustrating a reporting system for communicating information to the user relating to the object on the pathway.

FIGS. 1-3 collectively illustrate embodiments of a sensor system 100 for detecting an inanimate object/hazard 105 on a pathway 110, and for reporting information relating to the object 105 to a user 115. The information is aimed at notifying the user 115 about the object 105 so that the user 115 may avoid tripping or falling over the object 105 while walking on or along the pathway 110. With reference to FIGS. 1-3, the sensor system 100 includes a first sensor system 120 for detecting the presence of the user 115 within an activation field of the first sensor system 120, and a second sensor system 155 positioned along the pathway 110 to detect the object(s) 105 when it is positioned along the pathway 110. When the object 105 is positioned within the pathway 110 and is detected, the second sensor system 155 generates a signal to communicate the object information to a reporting system 180, which receives the object signal and in turn generates a warning signal to communicate to the user 115 information relating to the object 105, such as the location of the object 105, an identification of the object 105, and/or a movement pattern of the object 105 within the pathway 110. Upon being alerted that the object 105 is on the pathway 110, the user 115 may approach the pathway with care to avoid possible injury or causing accidental damage to the object 105. As illustrated in FIGS. 1-2, the pathway 110 may be a staircase. In other embodiments, the pathway 110 may be a ramp, a hallway, a walkway, or any other suitable pathway. The following section describes additional details of these and other embodiments of the sensor system 100.

With particular reference to FIG. 1, the first sensor system 120 includes one or more sensors 125, 130 for detecting the presence of the user 115 near or within the pathway 110. The sensors 125, 130 may be positioned at or near the ends of the pathway 110 to detect the user's 115 approach from either side of the pathway 110. For example, the first sensor system 120 may include a first sensor 125 positioned proximal to the top step 135 (or initial step/entry portion) of the pathway 110 (e.g., staircase), and a second sensor 130 positioned proximal to the bottom step 140 (or final step/exit portion) of the pathway 110. The first and second sensors 125, 130 may each have activation fields that overlap the top step 135 and bottom step 140, respectively, to detect the user 115 as he or she approaches the pathway 110 from either the top or the bottom. Any one of a variety of sensors capable of detecting the presence of the user 115 may be suitable for use with the first sensor system 120. For example, the sensors 125, 130 may include any of the following: optical sensors, acoustic sensors, infrared sensors, photocell sensors, ultrasonic sensors, radar sensors, proximity sensors, pressure sensors/plates, motion sensors, or any other active or passive sensors. In some embodiments, the first sensor system 120 may include an RFID sensor configured to detect an RFID tag carried or otherwise worn by the user 115.

In some embodiments, the first sensor system 120 may also include additional sensors 145 positioned along the staircase, such as attached to various points on the handrail 150 or positioned near a wall adjacent individual stairs of the staircase, where the additional sensors 145 are configured to monitor the movement of the user 115 through the pathway (or staircase) 110 and determine positional information of the user 115 relative to the pathway (or staircase) 110. In other embodiments, the first sensor system 120 may be in communication with smart apparel (e.g., apparel in communication with the sensors of the first sensor system) worn by the user 115 to detect the presence of the user within the staircase, and also detect movement and position information of the user.

In still other embodiments, the first sensor system 120 may be in communication with an electronic device (not shown), such as a mobile phone, personal data assistant (PDA), an electromagnetic transmitter, an ultrasonic transmitter, or other suitable device, carried by the user 115. The electronic device may include a position determination system, such as a GPS or environmental tracking system, configured to generate position information and communicate the information to the first sensor system 120. With this information, the first sensor system 120 may be able to detect the user 115 and track movement of the user 115 through the pathway 110. As is further described in detail with respect to the reporting system 180, motion and positional information may be communicated to the reporting system 180 to assess a likelihood of a collision in real-time and determine whether to provide additional or different warnings to the user 115.

As mentioned previously, the safety system 100 further includes a second sensor system 155 for detecting an object 105 within a sensor field of the second sensor system 155 (see FIG. 2). The object 105 may be any animate or inanimate object that may be present on the pathway at any given time. For example, the object may be an animal, such as a cat or dog, liquid, paper, a toy, a moving object (such as a rolling ball), a stationary object (such as a box), debris, or any other object. The sensor field of the second sensor system 155 is preferably sufficiently large to monitor the entirety of the pathway 110 to ensure that any object 105 present therein is detected, and to also monitor a region 160 extending beyond the pathway 110. For example, for the staircase illustrated in FIG. 2, the sensor field of the second sensor system 155 preferably includes the top step 135, the bottom step 140, the plurality of steps therebetween (not numbered for clarity), and a region after the bottom step (or ending portion) 160 and a similar region (not numbered) in front of the top step 135 (or beginning portion). This expansive sensor field allows the second sensor system 155 not only to detect objects 105 within the pathway 110, but also to detect objects 105 that may be approaching the staircase or that are near the staircase but have not yet cross the threshold into the staircase. In other embodiments, the second sensor system 155 may instead only monitor a portion of the pathway, such as a blind corner, a dark area, or other potentially perilous areas.

Similar to the first sensor system 120, the second sensor system 155 may include one or more sensors 165 to monitor the pathway 110 and to monitor the movement of the object 105 through the staircase and determine positional information of the object 105 relative to the staircase (or relative to the user as further described below). The sensors 165 may be positioned in various configurations along the pathway 110. In one example arrangement, second sensor system 155 may include multiple sensors 165 each positioned adjacent individual step of the staircase and configured to individually monitor the corresponding step. For example, with reference to FIG. 2, the sensors 165 may detect the object 105 when positioned proximate the top step 135, the bottom step 140, or any other step (e.g., the object 105 is shown on step 170) of the staircase. In some embodiments, the sensors 165 may instead be positioned on the risers 175 between the individual steps of the staircase. In other embodiments, the sensors 165 may be positioned on both the risers 175 and adjacent the steps. In still other embodiments, the second sensor system 155 may include only a single overhead sensor (not shown) with a field of view facing downwardly over the pathway 110 to monitor the entire pathway 110. It will be understood by those with skill in the art that other suitable configurations not specifically described herein may be possible.

In addition, any one of a variety of sensors capable of detecting the object 105 and obtaining information from the object 105 may be suitable for use with the second sensor system 155. For example, the sensors 165 may include any of the following: optical sensors, acoustic sensors, infrared sensors, photocell sensors, ultrasonic sensors, radar sensors, proximity sensors, pressure sensors/plates, Doppler sensors, motion sensors, or any other active or passive sensors. In some embodiments, the second sensor system 155 may include an RFID sensor configured to detect an RFID tag carried or otherwise attached to the object (e.g., attached to a pet's collar). In other embodiments, the object 105 may include a transmitter device and/or a positioning determination system attached thereto, and the second sensor system 155 may include at least one sensor configured to receive a signal (e.g., an electromagnetic or ultrasonic signal) emitted by the transmitter device, or to receive positioning information from the positioning determination system, to track the position and movement of the object 105.

Upon detecting the object 105, the second sensor system 155 obtains information relating to the object, such as location or position of the object on the pathway, movement speed of the object, direction of motion of the object (e.g., the object is moving down the stairs or up the stairs), identification information of the object (including dimensional information of the object, such as height and length), or other information, and generates an object signal to communicate the object information to the reporting system 180. In some embodiments, the second sensor system 155 may further determine whether the object is animate, inanimate, stationary, moving, or other similar characteristics of the object 105.

Preferably, the second sensor system 155 is configured to detect the simultaneous presence of a plurality of objects 105 on the pathway 110 and generate the object signal, which includes position information identifying the location of each of the objects 105. For example, with reference to FIG. 2, the second sensor system 155 may determine that there is a box 105 on the third step 185 of the staircase, and a ball 105 near a middle step 170 of the staircase. In this scenario, the second sensor system 155 may identify the location and identity of each of these items, and communicate the information to the reporting system 180 (see FIG. 3) to alert the user of the presence of the multiple objects 105 on the pathway 110. Further details of the reporting system 180 are described below with particular reference to FIG. 3.

Although the first and second sensor systems 120, 155 have been described as individual, standalone systems, the first and second sensor systems 120, 155 may be in communication with one another and/or may each be subsystems in a larger, integrated sensor system with shared components. In such embodiments, the first and second sensor systems 120, 155 may operate as independent subsystems (as described earlier) or may cooperate with one another. For example, in one embodiment, when the first sensor system 120 detects the presence of the user 115 within its activation field, the first sensor system 120 sends an activation or wake-up signal to activate the second sensor system 155. Once activated, the second sensor system 155 determines whether an object 105 is present in the pathway 110. In some embodiments, once the second sensor system 155 detects the presence of the object 105 in the pathway 110, the second sensor system 155 may further detect the presence and precise location of the user 115 within the sensor field of the second sensor system 155 and communicate to the reporting system 180 positioning information of the user 115 relative to the object 105.

In other embodiments, the second sensor system 155 may instead generate the activation or wake-up signal upon detection of the object 105 in the pathway. In response to receiving the activation signal, the first sensor system 120 thereafter determines whether a user 115 is present near or adjacent the pathway 110. In still another embodiment, the safety system 100 may include a separate controller (not shown) which is in communication with both the first and second sensor systems 120, 155. In response to activation of either system 120, 155, a bit is set in the controller to indicate that one system has been activated. Periodically, the non-activated system can check the status of the bit, and wake up if the bit is set.

As mentioned previously, in response to detecting the object 105 within the sensor field, the second sensor system 155 obtains object information relating to the object 105 and generates an object signal based on the object information to communicate that information to a reporting system 180 (see FIG. 3). The reporting system 180 receives the object signal from the second sensor system 155 and generates a warning signal to communicate the object information to the user 115 to alert the user 115 to the presence of the object 105 on the pathway 110. The following section describes additional information relating to the reporting system 180.

In some embodiments, the reporting system 180 accounts for the position and/or the motion of the user 115 relative to the object 105 in determining whether to generate the warning signal. For example, if the object 105 appears at the top step 135 of the staircase after the user 115 has already passed that point (e.g., the user is walking down the stairs and is near the middle of the staircase), the reporting system 180 may not generate any warning signal since the object 105 no longer poses any danger to the user 115. However, if the user 115 turns around and begins walking up the stairs, the second sensor system 155 detects the change of direction and the reporting system 180 may then generate the warning signal.

In some embodiments, the reporting system 180 accounts for the position and/or motion of the object 105 relative to the user 115 in determining whether to generate the warning signal. For example, if the object 105 appears at the top step 135 of the staircase 110 after the user 115 has already passed that point (e.g., the user is walking down the stairs and is near the middle of the staircase), the reporting system 180 may nonetheless generate a warning signal if the second sensor 155 detects that the object 105 (e.g., a cat or a ball) is moving down the stairs at a high enough rate of speed relative to user 115 so that it is predicted to reach user 115 while user 115 is still on the staircase 110. In some embodiments, the reporting system 180 may base the generation of a warning signal on the direction in which user 115 is facing, e.g., always generate a warning signal when user 115 is facing away from an approaching object 105, but not always do so when user 115 is facing towards object 105. The direction in which user 115 is facing may be determined directly (e.g., by a camera in first sensor system 120) or indirectly (e.g., inferred from the direction of motion of user 115). In some embodiments, the reporting system 180 may base the generation of a warning signal on ambient lighting. For example, the reporting system 180 may always generate a warning signal in low light conditions, but may not always do so in well-lit conditions.

FIG. 3 is a partial cut-away view of the pathway 110 illustrating an example reporting system 180 positioned adjacent the top step 135 of the pathway 110 for communicating information to the user 115 relating to the object 105. As described previously, the reporting system 180 may deliver the warning signal in any number of suitable methods, which, in some embodiments, may depend on the object information related to the object 105. For example, in some embodiments, such as where the object 105 is an inanimate object, the warning signal may include an audible signal, such as an alarm, a spoken message (e.g., a command to stop, a command to stay left or right, or any other command), or other signal heard by the user delivered through a speaker system 190. The warning signal may additionally, or alternatively include, a visual signal perceived by the user 115. The visual signal may be presented to the user 115 on a display screen 195 and may include the object information 200 obtained from the object (such as identity of the object, location of the object, etc.), an image 205 of the object, or any other graphic image or textual message. With reference to FIG. 3, the display screen 195 may mounted near the top step 135 of the pathway (or staircase) 110 for easy reference or viewing by the user 115. Since injury may be more likely and/or more severe if one were to fall going down the stairs rather than fall while walking up the stairs, it is preferable that the reporting system 180 (and in particular the display screen 195) is positioned near the top step 135 of the pathway (or staircase) 110. In other embodiments, the reporting system 180 may be positioned both at the top step 135 and the bottom step 140 of the pathway 110. In still other embodiments, the display screen 195, or a second display screen (not shown), may be positioned near the bottom of the pathway 110, and/or at any other convenient point along the pathway 110.

Figure 4:
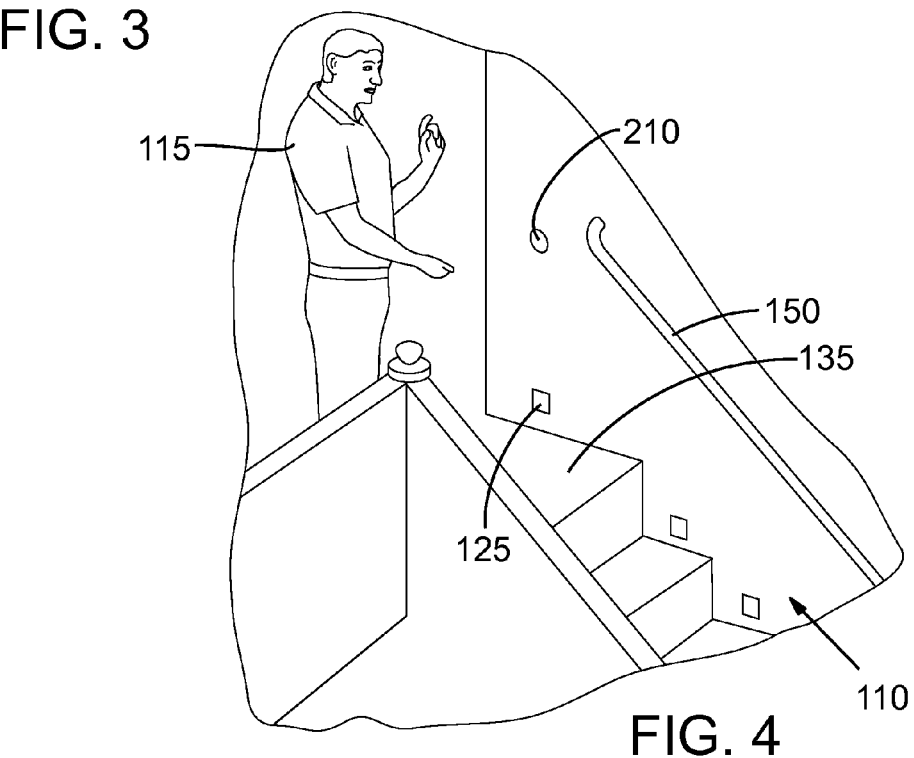
FIG. 4 is a partial cut-away view of the pathway illustrating a reporting system according to another embodiment.

In other embodiments, the visual signal may simply be a light source that indicates to the user whether an object 105 is present on the pathway 110 or not. FIG. 4 illustrates an alternate embodiment of the reporting system 180. With reference to FIG. 4, a light-emitting diodes (LED) 210 or other light source may be mounted adjacent both a first end (e.g., the top step 135 of the staircase) and a second end (e.g., the bottom step 140 of the staircase) of the pathway 110 (or any other location along the pathway 110). When no object 105 is detected on the pathway 110, the LED 210 on the top step 135 and the bottom 140 (not shown) may be green, indicating that the pathway 110 is free of objects 105. When an object 105 is detected on the pathway 110, the LED 210 may switch from green to red to warn the user 115 that an object 105 has been detected on the pathway 110. As the user 115 approaches the pathway 110, the user may first check the status of the LED 210 to determine whether the pathway 110 is safe to walk on or whether the user 115 should be searching for the location of the object 105 on the pathway 110.

In some embodiments, the reporting system 180 may include an output device (not shown), such as a small radio, a mobile phone, or other electronic device, that is carried or worn by the user 115 and is in wireless communication with the reporting system 180. In such embodiments, the audible signal may be communicated from the reporting system 180 through the output device so that the user 115 can hear the signal. In some instances, the warning signal may include a vibratory signal where the output device (e.g., a mobile phone) vibrates so that the user 115 can feel it. Once the user 115 feels the vibration, the user 115 may check his or her mobile phone to determine whether the reporting system 180 is sending a warning signal alerting the user 115 of the presence of the object 105 in the pathway 110.

In other embodiments, the reporting system 180 may alternatively (or additionally) generate the warning signal to urge movement of the object away from the pathway 110. For example, in instances when the object 105 is a cat, dog, or other animate object moving along the pathway 110, the warning signal may include a visual signal perceived by the object 105 (such as a laser point aimed off the pathway to urge the cat, dog, or other animal to chase), an audible or ultrasonic signal heard by the object 105 to urge movement off the pathway 110, or a vibratory signal felt by the object 105. In some embodiments, the reporting system 180 may include various output or electronic devices positioned at various points along the pathway 110 to deliver the warning signal depending on a position of the object 105. For example, the warning signal may be delivered by the output or electronic device that is closest to the object 105 to increase the likely effectiveness of the warning signal.

In other embodiments, an electronic device (not shown) in wireless communication with the reporting system 180 may be attached to a collar of the cat or dog and configured to deliver a vibratory signal when the object 105 is on the pathway 110 concurrently with a human user 115, so that the cat or dog may run away. The warning signal may also include an audible signal heard by the user 115 or a visual signal perceived by the user 115 so that the user 115 is aware that a cat or dog may be moving on the pathway 110.

As mentioned previously, the second sensor system 155, in some embodiments, may be configured to detect a particular location of the object 105 on any individual step of the staircase. In such embodiments, the object signal generated by the second sensor system 155 includes object information pertaining to the precise step where the object 105 is located. When the reporting system 180 receives the object signal, the reporting system 180 communicates to the user 115, such as via the display screen 195, the step at which the object 105 is located so that the user 115 can quickly locate the object 105. As described previously, the display screen 195 may present an image and textual description of the object 105 to the user 115, along with the location information so that the user 115 can quickly identify the object 105 and its precise location. The reporting system 180 may further communicate whether the step at which the object 105 is located is above or below (or forward or aft) the current position of the user 115, or may indicate the number of steps separating the user 115 from the object 105 on the staircase.

With reference to FIG. 1, the safety system 100 may include an illumination system 215 positioned adjacent (or above) the pathway 110. Preferably, the illumination system 215 is in communication with one or both of the second sensor system 155 and the reporting system 180. When the object 105 is detected on the pathway 110, the illumination system 215 is activated to illuminate a portion, or the entirety of, the pathway 110 to aid the user 115 in locating the object(s) 105 on the pathway 110. In some embodiments, the illumination system 215 may include a plurality of individual light sources (such as LEDs) 220, where each of the light sources 220 is configured to illuminate a predetermined section of the pathway 110. In such embodiments, a single illumination source is attached or mounted adjacent a corresponding step of the pathway (or staircase) 110. In this arrangement, the illumination system 215 is capable of individually illuminating each of a plurality of objects 105 on the pathway 110. For example, with reference to FIG. 1, when the object 105 is detected in the pathway 110, the corresponding illumination source 220 is activated to illuminate the object 105 on the step, while the remaining illumination sources remain in the off position.

In another embodiment, the illumination system 215 is capable of tracking the object 105, e.g., a moving object, with illumination as the object 105 moves through the pathway 110 so that the user 115 may be aware of the object's 105 movement and real-time location. The illumination system 215 may include one or more indicators, for example a color indicator, to provide to the user 115 information regarding a movement status of the object 105. For example, when an object 105 is detected on the pathway 110 and is determined to be stationary, the corresponding illumination source 220 is activated to illuminate the object 105 with red light to indicate to the user 115 that the object 105 is stationary. When the object 105 is detected on the pathway 110 and determined to be moving away from the user, the corresponding illumination source 220 is activated to illuminate the object 105 with a green light. The green light may indicate to the user 115 that the object 105 is not currently a hazard since it is moving away from the user 115. Finally, when the object 105 is detected on the pathway 110 and determined to be moving toward the user 115, the corresponding illumination source 220 is activated to illuminate the object 105 with a yellow light. The yellow light may indicate to the user 115 to use caution since the object 105 is moving toward the user 115 and may present an imminent hazard.

In an embodiment, the reporting system 180 is capable of tracking the object 105 (e.g., a moving object) as the object moves through the pathway 110 so that the user 115 may be aware of the object's 105 movement and location. For example, the reporting system 180 may include one or more output devices, such as a plurality of speakers along the pathway 110 that produce sound near the object 105. As the object 105 moves, speakers corresponding to the location nearest the object 105 are activated to track the object 105. In other embodiments, a single speaker able to project sound may be used to track the object 105.

In other embodiments, the reporting system 180 may include one or more indicators, such as a color indicator or a speaker, to provide information regarding the object 105 to the user 115. For example, when an object 105 is detected on the pathway 110 and is determined to be stationary, the speaker(s) of the reporting system 180 are activated to produce an indicator sound of predetermined intensity. When the object 105 is detected in the pathway 110 and determined to be moving away from the user 115, the speaker(s) of the reporting system 180 are activated to produce an indicator sound of decreasing intensity or volume to indicate the object 105 is moving away from the user 115. If the object 105 is moving toward the user 115, the speakers may produce an indicator sound of increasing intensity or volume. If the object 105 is stationary, the speakers may produce an indicator sound of constant intensity or volume.

Figure 5:
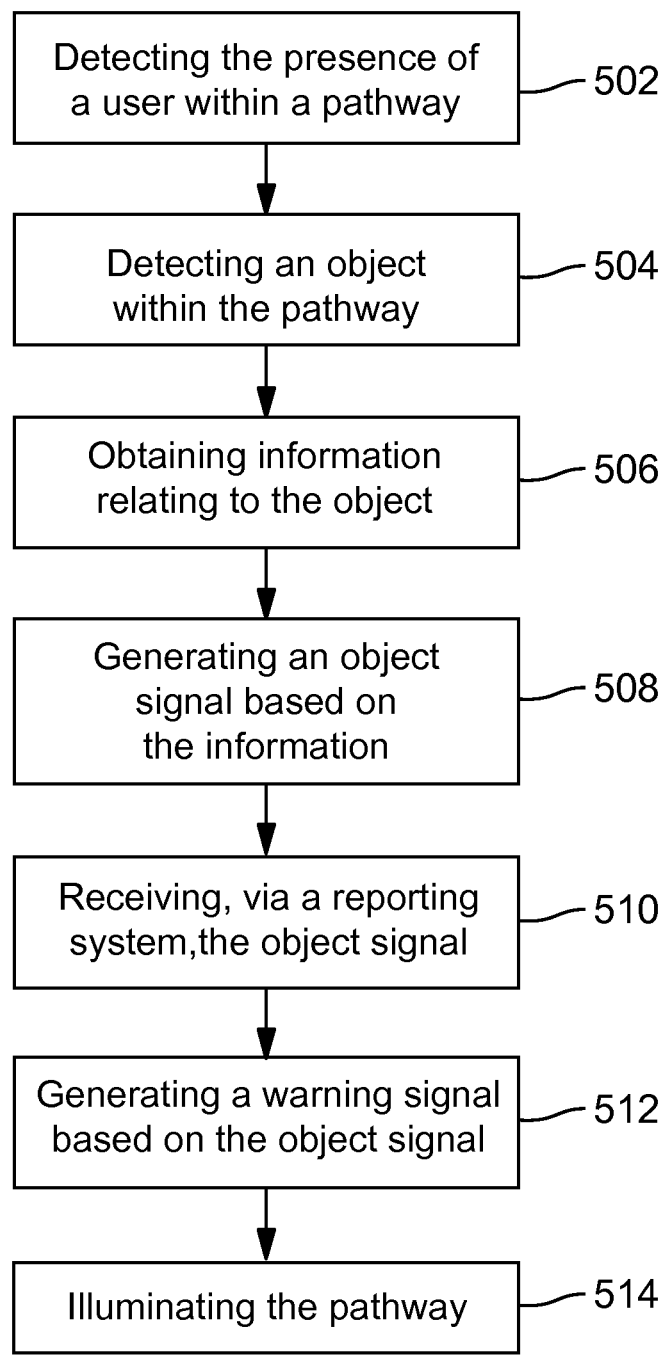
FIG. 5 is a block diagram illustrating a method for detecting an object on a pathway, according to one embodiment.

FIG. 5 is a block diagram illustrating a method of detecting an object on a pathway and reporting information relating to the object to a user. It should be understood that the method described below is for illustration purposes and the order in which the steps are described is not meant to be limiting. It should be understood that in other embodiments, the steps may occur in a different order. With particular reference to FIG. 5, in some embodiments, a first sensor system detects a presence of a user within an activation field of the first sensor system at step 502. In some embodiments, the first sensor system may also detect positional information of the user relative to the pathway, where the positional information may include the step at which the user resides, or whether the user is going up the stairs or down the stairs. The first sensor system may also determine motion information of the user (e.g., whether the user is moving or standing still and/or the speed of the user's movement). In some embodiments, one or both of the positional information and motion information may be determined by communication of the first sensor system with an electronic device (such as a mobile phone) having a position determination system (e.g., GPS), where the electronic device is carried by the user.

At step 504, a second sensor system detects an object within a sensor field of the second sensor system, the sensor field including at least a portion of the pathway. In some embodiments, the sensor field may also include a region extending beyond the pathway. In some embodiments, the first sensor system may generate and send an activation signal in response to the presence of the user within the activation field, where the activation signal powers on or triggers the second sensor system. In other embodiments, the second sensor system may instead send an activation signal in response to detection of the object, where the activation signal powers on or triggers the first sensor system.

At step 506, in response to detecting the object within the sensor field, the second sensor system obtains information relating to the object, and at step 508, the second sensor system generates an object signal based on the object information. In some embodiments, the information may include an image of the object, an identification of the object, and/or a location of the object on the pathway (e.g., a particular step of the staircase). In some embodiments, the object (such as a cat or dog) may have a position determination system attached to it (such as via a collar), where the second sensor system is in communication with the position determination system to obtain information from the object.

At step 510, a reporting system receives the object signal from the second sensor system, and at step 512, the reporting system generates a warning signal based on the object signal, the warning signal communicating to the user the object information. In some embodiments, the warning signal includes at least one of a visual signal perceived by the object, an audible signal heard by the object, an ultrasonic signal heard by the object, or a vibratory signal felt by the object. In other embodiments, the warning signal may be communicated to an output device attached to or carried by the user. The warning signal may include information about the object, such as the identity of the object, an image of the object, and/or a precise location of the object. In some embodiments, the reporting system may also communicate to the user whether the object is in front of or behind the user's current position, or whether the object is moving or stationary. When the user receives the warning signal, the user may thereafter identify the object, identify a location of the object, and select a path along the pathway to safely avoid the object.

In some embodiments, at step 514, an illumination system may illuminate the object(s) detected by the second sensor system so that the user can identify the object(s) on the pathway. For example, the illumination system may include a plurality of LEDs or other light sources arranged at various locations of the pathway so that each of the LEDs illuminates individual regions or steps of the pathway. When the object(s) are located by the second sensor system, the illumination system may activate particular LEDs to illuminate the locations at which the object(s) is present. In other embodiments, the illumination system may be an overhead system that illuminates all or substantially all of the pathway to allow the user to locate the object(s).

Other embodiments are possible. Although the description above contains much specificity, these details should not be construed as limiting the scope of the invention, but as merely providing illustrations of some embodiments of the invention. It should be understood that subject matter disclosed in one portion herein can be combined with the subject matter of one or more of other portions herein as long as such combinations are not mutually exclusive or inoperable.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A safety system for detecting a hazard on a pathway and reporting information relating to the hazard to a user, the system comprising:

a first sensor system configured to detect a presence of the user within an activation field of the first sensor system as the user enters the pathway;

a second sensor system to be activated by the first sensor system based on the detected presence of the user within the activation field by the first sensor system, the second sensor system configured to detect an object within a sensor field of the second sensor system, the sensor field including at least a portion of the pathway, wherein, in response to detecting the object within the sensor field, the second sensor system obtains object information relating to the object, including at least a relative location of the object within the pathway, and generates an object signal based on the object information, and wherein the second sensor system is further configured to track a position of the object as it moves within the pathway from a first position to a second position to identify a movement of the object within the pathway; and a reporting system in communication with the second sensor system, the reporting system receiving the object signal from the second sensor system and generating a warning signal to communicate the detected object information to the user regarding the object within the pathway based on the object signal, the warning signal comprising and communicating the object information to the user to notify the user about the object on the pathway.

2. The system of claim 1, wherein the first sensor system is further configured to determine positional information of the user relative to the pathway.

3. The system of claim 1, wherein the first sensor system is further configured to determine motion information of the user relative to the pathway.

4. The system of claim 1, wherein the second sensor is further configured to detect a presence of the user within the sensor field, and wherein the object information includes positioning information of the user relative to the object.

5. The system of claim 1, wherein the pathway includes an entry portion and an exit portion opposite the entry portion, and wherein the first sensor system includes a first activation sensor with a first activation field and a second activation sensor with a second activation field, wherein the first activation field includes a first region proximal the entry portion of the pathway and the second activation field includes a second region proximal the exit portion of the pathway.

6. The system of claim 1, wherein the pathway includes a staircase having a top step, a bottom step, and one or more steps between the top and bottom step, and wherein the first sensor system includes a first activation sensor, and wherein the activation field of the first sensor system includes a region proximal to at least one step of the staircase.

7. The system of claim 1, wherein the pathway includes a staircase having a top step, a bottom step, and one or more steps between the top and bottom step, and wherein the first sensor system includes a first activation sensor with a first activation field and a second activation sensor with a second activation field, wherein the first activation field includes a first region proximal the top step of the staircase and the second activation field includes a second region proximal the bottom step of the staircase.

8. The system of claim 1, wherein the second sensor system includes a first object recognition sensor configured to obtain the object information relating to the object.

9. The system of claim 8, wherein the first object recognition sensor is configured to receive positioning information generated by a position determination system attached to the object.

10. The system of claim 8, wherein the pathway includes a staircase having a top step, a bottom step, and one or more steps between the top and bottom step, and wherein the first object recognition sensor is configured to detect the object when the object is positioned on a first step of the one or more steps of the staircase.

11. The system of claim 1, wherein the second sensor system includes one or more object recognition sensors, each sensor located at a different position along the pathway, and wherein each sensor has a corresponding sensor field for which the sensor is configured to detect the object when the object is located within the sensor field.

12. The system of claim 8, wherein the object information includes positioning information of the object relative to the pathway.

13. The system of claim 8, wherein the object information comprises a direction of motion of the object relative to the pathway.

14. The system of claim 12, wherein the pathway includes a staircase having a plurality of steps, and the positioning information identifies at least one step of the plurality of steps at which the object is located.

15. The system of claim 14, wherein the reporting system further communicates to the user the at least one step of the plurality of steps at which the object is located.

16. The system of claim 14, wherein the reporting system further communicates to the user whether the step at which the object is located is above or below a step at which the user is located.

17. The system of claim 14, wherein the reporting system further communicates to the user the number of steps separating the user and the object on the staircase.

18. The system of claim 1, wherein the second sensor system is further configured to detect a plurality of objects on the pathway, and wherein the object signal of the second sensor system includes positioning information of a location of the object relative to the pathway for each of the plurality of objects.

19. The system of claim 1, further comprising an illumination system in communication with one or both of the second sensor system and the reporting system, wherein the illumination system is activated to illuminate the object on the pathway in response to the second sensor system detecting the object on the pathway.

20. The system of claim 19, wherein the second sensor system is further configured to detect a plurality of objects on the pathway, and wherein the illumination system is further configured to illuminate the plurality of objects detected on the pathway.

21. The system of claim 1, wherein the reporting system is further configured to track a position of the object as it moves through the pathway.

22. The system of claim 21, wherein the reporting system includes one or more output devices positioned along or near the pathway, the one or more output devices configured to output sound at different intensity levels depending on a status of the object.

23. The system of claim 1, wherein the reporting system is configured to generate the warning signal based upon positioning information of the object relative to the user.

24. A method for detecting a hazard on a pathway and reporting information relating to the hazard to a user, the method comprising:
  detecting, via a first sensor system, a presence of [a] the user within an activation field of the first sensor system as the user enters the pathway;
  activating a second sensor system in response to a detected presence of the user with the activation field;
  detecting, via the second sensor system, an object within a sensor field of the second sensor system, the sensor field including at least a portion of the pathway;
  in response to detecting the object within the sensor field, obtaining, via the second sensor system, object information relating to the object including at least a relative location of the object within the pathway;
  tracking the object as it moves from a first position within the pathway to a second position within the pathway to identify a movement of the object within the pathway;
  generating, via the second sensor system, an object signal based on the object information;
  receiving, via a reporting system, the object signal from the second sensor system; and
  generating, via the reporting system, a warning signal to warn the user of the object located in the pathway based on the object signal, the warning signal comprising and communicating the object information to the user to notify the user about the object on the pathway.

25. The method of claim 24, further comprising determining, via the first sensor system, positional information of the user relative to the pathway.

26. The method of claim 24, further comprising determining, via the first sensor system, motion information of the user relative to the pathway.

27. The method of claim 24, further comprising detecting, via the second sensor system, a presence of the user within the sensor field, and wherein the object information includes positioning information of the user relative to the object.

28. The method of claim 24, wherein the pathway includes an entry portion and an exit portion opposite the entry portion, and wherein the first sensor system includes a first activation sensor with a first activation field and a second activation sensor with a second activation field, wherein the first activation field includes a first region proximal the entry portion of the pathway and the second activation field includes a second region proximal the exit portion of the pathway.

29. The method of claim 24, wherein the pathway includes a staircase having a top step, a bottom step, and one or more steps between the top and bottom step, and wherein the first sensor system includes a first activation sensor, and wherein the activation field of the first sensor system includes a region proximal to at least one step of the staircase.

30. The method of claim 24, wherein the pathway includes a staircase having a top step, a bottom step, and one or more steps between the top and bottom step, and wherein the first sensor system includes a first activation sensor with a first activation field and a second activation sensor with a second activation field, wherein the first activation field includes a first region proximal the top step of the staircase and the second activation field includes a second region proximal the bottom step of the staircase, and wherein the method further comprises detecting, via one of the first or second activation sensors, the presence of the user.

31. The method of claim 24, wherein the second sensor system includes a first object recognition sensor configured to obtain the object information relating to the object.

32. The method of claim 31, further comprising:
  generating, via a position determination system attached to the object, positioning information of the object; and
  delivering the positioning information to the first object recognition sensor to detect the presence of the object.

33. The method of claim 31, wherein the pathway includes a staircase having a top step, a bottom step, and one or more steps between the top and bottom step, and further comprising detecting, via the first object recognition sensor, the object when the object is positioned on a first step of the one or more steps of the staircase.

34. The method of claim 24, wherein the second sensor system includes one or more object recognition sensors, each sensor located at a different position along the pathway, and wherein each sensor has a corresponding sensor field for which the sensor is configured to detect the object when the object is located within the sensor field.

35. The method of claim 31, wherein the information includes positioning information of the object relative to the pathway.

36. The method of claim 35, wherein the pathway includes a staircase having a plurality of steps, and the positioning information identifies at least one step of the plurality of steps at which the object is located.

37. The method of claim 36, further comprising communicating to the user, via the reporting system, the at least one step of the plurality of steps at which the object is located.

38. The method of claim 36, further comprising communicating to the user, via the reporting system, whether the step at which the object is located is above or below a step at which the user is located.

39. The method of claim 36, further comprising communication to the user, via the reporting system, a number of steps separating the user and the object on the staircase.

40. The method of claim 24, further comprising detecting, via the second sensor system, a plurality of objects on the pathway, and generating, via the second sensor system, an object signal including positioning information of a location of the object relative to the pathway for each of the plurality of objects.

41. The method of claim 24, further comprising illuminating, via an illumination system in communication with one or both of the second sensor system and the reporting system, the object on the pathway in response to the second sensor system detecting the object on the pathway.

42. The method of claim 41, further comprising:
detecting, via the second sensor system, a plurality of objects on the pathway; and
illuminating, via an illumination system, the plurality of objects detected on the pathway.

43. The method of claim 24, tracking, via the reporting system a position of the object as it moves through the pathway.

44. The method of claim 43, wherein the reporting system includes one or more output devices positioned along or near the pathway, the method further comprising outputting sound, via the one or more output devices at different intensity levels depending on a status of the object.

45. The method of claim 24, the method further comprising generating, via the reporting signal, the warning signal based upon positioning information of the object relative to the user.

* * * * *

UNITED STATES PATENT AND TRADEMARK OFFICE
CERTIFICATE OF CORRECTION

PATENT NO.       : 9,582,976 B2                                                                 Page 1 of 1
APPLICATION NO.  : 14/516424
DATED            : February 28, 2017
INVENTOR(S)      : Hon Wah Chin et al.

It is certified that error appears in the above-identified patent and that said Letters Patent is hereby corrected as shown below:

In the Claims

Column 13, Lines 65-66, Claim 24 "first sensor system, a presence of [a] the user within" should read --first sensor system, a presence of the user within--

Signed and Sealed this
Twenty-third Day of May, 2017

Michelle K. Lee
*Director of the United States Patent and Trademark Office*